United States Patent [19]
Acker

[11] 4,317,080
[45] Feb. 23, 1982

[54] SIGNAL MONITOR SYSTEM
[75] Inventor: William F. Acker, Seminole, Fla.
[73] Assignee: Honeywell Inc., Minneapolis, Minn.
[21] Appl. No.: 102,601
[22] Filed: Dec. 12, 1979

Related U.S. Application Data
[62] Division of Ser. No. 829,705, Sep. 1, 1977, Pat. No. 4,207,523.
[51] Int. Cl.³ .................. H03K 5/153; H03K 5/24
[52] U.S. Cl. .................. 328/151; 307/360; 328/116; 328/147
[58] Field of Search .......... 307/353, 360, 361; 328/116, 146–149, 151; 340/347 AD

[56] References Cited
U.S. PATENT DOCUMENTS

| | | | |
|---|---|---|---|
| 2,642,527 | 6/1953 | Kelley | 328/116 |
| 3,784,921 | 1/1974 | Iadipaolo | 307/360 X |
| 3,809,925 | 5/1974 | Hertz | 307/361 |

Primary Examiner—John Zazworsky
Attorney, Agent, or Firm—Theodore F. Neils

[57] ABSTRACT

An amplitude range classifier for classifying the amplitude of an analog signal into one or more subranges of a larger range is provided.

3 Claims, 1 Drawing Figure

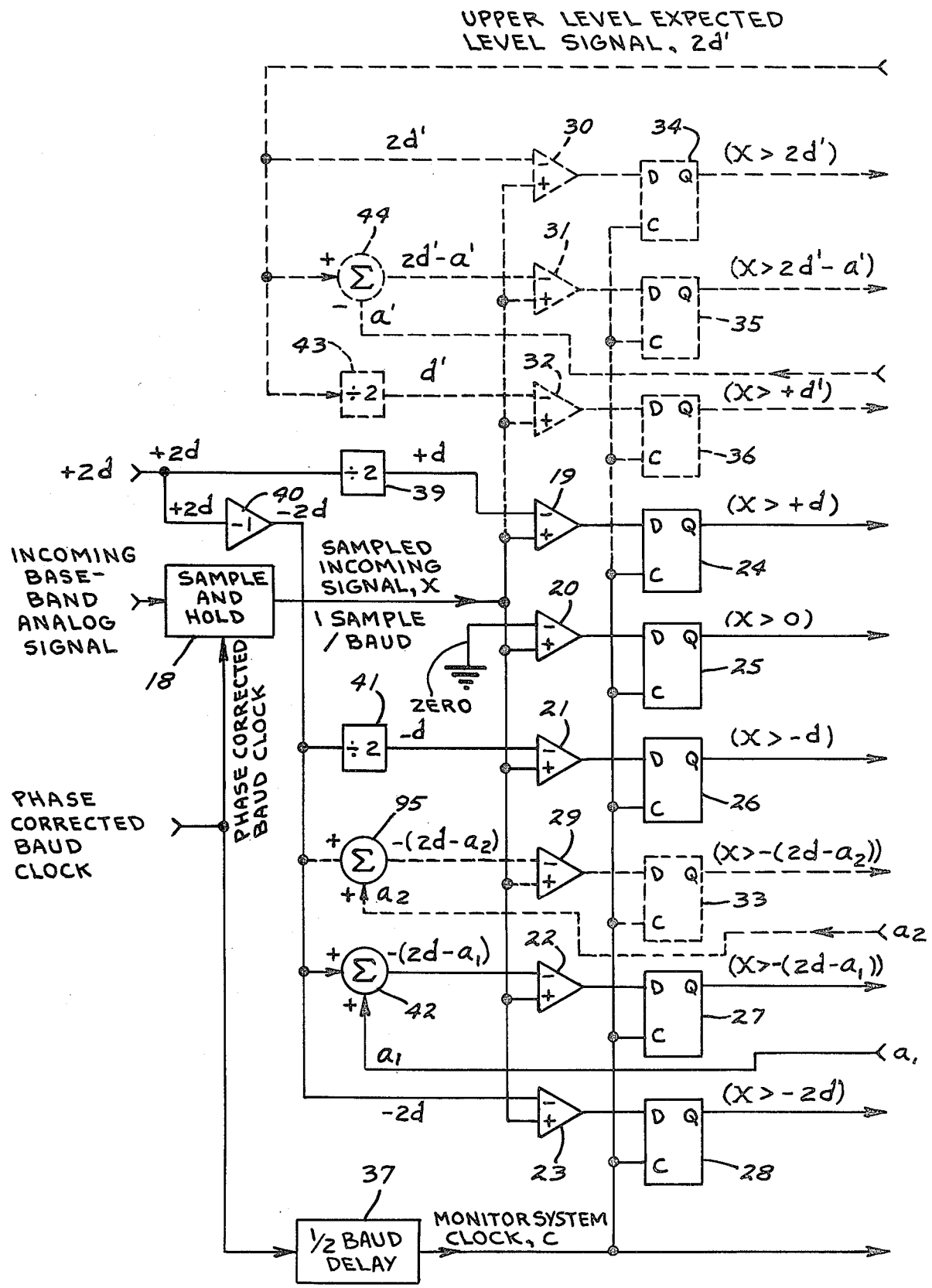

SIGNAL MONITOR SYSTEM

The invention herein discribed was made in the course of, or under a contract, or subcontract thereunder, with the Department of the Air Force.

This application is a divisional application of application Ser. No. 829,705 filed Sept. 1, 1977, now U.S. Pat. No. 4,207,523, issued June 10, 1980. That patent is incorporated herein by reference.

BACKGROUND OF THE INVENTION

The present invention relates to an amplitude range classifier for classifying amplitudes of an analog signal into one or more subranges of a larger range according to value of that amplitude.

Communication channels can be entirely analog extending from the information source to the transmitter, and then along the channel link to the receiver, and finally to the user of the transmitted information. Communication channels can also be digitally based, either totally or partially. A typical situation is to have a digital information source but where the information is sent in analog form over an analog channel link to a receiver which reconverts the information to a digital format.

In digitally based communications channels the amplitude of incoming baseband analog signals often contains the information carried by the signal. Thus, extracting information from the signal through knowledge of signal amplitudes at various times must be accomplished.

Amplitude range classifiers operate by dividing the range into which incoming signal amplitudes may fall into various subranges. Comparators may then be used to determine the subrange or subranges into which the amplitude of a particular data sample from the incoming baseband analog signal fits. The various comparators should operate in effect at the same time to ensure that a single value for each data sample from the incoming baseband analog signal is presented to each comparator for comparison with subrange boundary reference signals.

Conceptually, the function performed by the amplitude range classifier system could be performed by the use of an analog-to-digital converter which would supply digitized data samples at the output thereof to a series of digital comparators. However, at the very high baud rates at which digitally based communications channels often operate, there is not sufficient time for the currently available analog-to-digital converters to converge on a value for one data sample before the next data sample is to be taken.

Again conceptually, the monitor system could function satisfactorily with analog comparators in the amplitude range classifier all being connected directly to the incoming baseband analog signal if the time delays in each of the comparators and associated circuitry were either negligible or essentially identical. However, if there are delays and they are unequal, the effect is equivalent to having each of the comparators sampling at different times even if they are all controlled by a single clock.

SUMMARY OF THE INVENTION

An amplitude range classifier is provided using a sample and hold circuit to obtain samples from an incoming analog signal with each serially presented to a plurality of analog comparators. These analog comparators compare the amplitude values of the samples with reference levels defining subranges in the range of incoming baseband analog signals. Each of the comparators provides to a corresponding utilization means a logic output signal, determined by the relationship of the amplitude of the incoming analog signal at the time it was sampled and the reference level corresponding to that comparator, which accepts same after an adequate settling period.

BRIEF DESCRIPTION OF THE DRAWINGS

The sole FIGURE is a schematic diagram of the amplitude range classifier of the invention.

DESCRIPTION OF THE PREFERRED EMBODIMENT

The preferred embodiment will be described with respect to its use in a monitoring circuit for a three level partial response digitally based communication channel.

Turning now to the FIGURE, an implementation of the invention for use in a basic monitoring system is shown in solid lines. The dashed-line portions of the FIGURE represent implementations of the invention used in conjunction with further monitor system capabilities.

The incoming signal amplitude range classifier comprises first the system block designated sample and hold, 18. The amplitude range classifier further comprises a number of analog comparators, 19, 20, 21, 22 and 23, in the basic system. Finally, for the basic system, the amplitude range classifier also comprises several D-type flip-flops, 24, 25, 26, 27 and 28.

The amplitude range classifier, however, also extends to the added capability apparatus shown as dashed-line portions in the FIGURE. Thus, the amplitude range classifier also comprises additional analog comparators, 29, 30, 31, and 32, all shown in dashed-lines. Lastly, the amplitude range classifier also comprises further D-type flip-flops, 33, 34, 35 and 36, again shown in dashed-lines.

The basic concept of the monitoring system requires that all of the amplitude range classifier comparator output signals represent measurements of the incoming baseband analog signal that are effectively taken simultaneously. The use of a single sample and hold circuit 18 providing data samples therefrom to all of the comparators in the amplitude range classifier, with the allowance of an adequate settling time before clocking the comparator outputs into the D-type flip-flops, rigorously satisfies the severe requirement for simultaneous sampling of the incoming baseband analog signal.

In order to accomplish the above, three enabling or clocking signals are used. The first, termed BAUD CLOCK, is derived from the incoming baseband analog signal. Phase adjustment circuitry, such as that described more fully in U.S. Pat. No. 4,207,523, previously cited, derives a second clocking signal from the BAUD CLOCK signal. This is the PHASE CORRECTED BAUD CLOCK signal. A third clocking signal, the MONITOR SYSTEM CLOCK signal, is derived from the PHASE CORRECTED BAUD CLOCK signal in a manner to be described below.

Thus, the amplitude range classifier uses a standard sample and hold circuit arrangement for sample and hold block 18 to provide a discrete time, analog data sample at the output thereof, once in each baud period, which is obtained from the incoming baseband analog signal. This incoming baseband analog signal is a continuous time analog signal. Sample and hold circuit 18 is used to provide each data sample at its output to the inputs of the comparators connected thereto for a time sufficient for the transient response of these comparators to decay in amplitude before the comparator outputs are stored in the succeeding and connected D-type flip-flops.

The provision of an adequate settling time, i.e. a holding period, is accomplished by clocking the sample and hold circuit 18 with the PHASE CORRECTED BAUD CLOCK signal, to initiate a sampling, while clocking the D-type flip-flops with the MONITOR SYSTEM CLOCK signal to initiate these flip-flops to accept the signals at the corresponding comparator outputs for temporary storage during one baud period. The MONITOR SYSTEM CLOCK is delayed approximately half a baud period from the PHASE CORRECTED BAUD CLOCK by a delay block, 37, shown in the FIGURE, to thus establish the holding period.

The five comparators, 19, 20, 21, 22 and 23, compare the discrete time, analog data samples obtained from the incoming baseband analog signal with corresponding comparator reference signal voltages. Each of the amplitude range classifier comparators has a different reference voltage so as to break the total data sample voltage amplitude range into several subranges which, for the basic system, are separated by the values $+d$ volts, 0 volts, $-d$ volts, $-(2d-a_1)$ volts, and $-2d$ volts.

Of course, the comparators 29, 30, 31 and 32 also act to provide further subranges the total data sample amplitude range, these further subranges being introduced by the further comparator reference voltages of $-(2d-a_2)$ volts, $+d'$ volts, $(2d'-a')$ volts, and $+2d'$ volts.

The meanings and sources of the values $+2d'$, $+d'$, $-d$, $-2d$, $a'$, $a_1$, and $a_2$ are discussed below only to the extent necessary for an understanding of the amplitude range classifier. A more detailed explanation of their derivations and their functions in a monitor system may be found in U.S. Pat. No. 4,207,523, previously cited.

A voltage $+2d$ volts is obtained from a reference source and is passed through a polarity inverter. The voltage $+d$ volts is obtained by dividing the voltage $+2d$ volts in half by a divider, 39, which can be any of several precise and well known voltage divider circuits. As just stated above, the voltage $-2d$ volts is obtained from the $+2d$ volts through a polarity inverter, i.e. multiplication by $-1$, effected by a multiplier, 40, which can be provided by well known operational amplifier circuits. The voltage $-d$ volts is provided through a divider, 41, operating on the voltage output from multiplier 40. Divider 41 can be constructed much the same as divider 39.

The value $a_1$ volts is designated the LOWER LEVEL FIRST DISPERSION voltage signal and is determined by the nature of the degradation of the incoming baseband analog signal. The value $-(2d-a_1)$ volts is obtained from the output voltage of multiplier 40, providing $-2d$ volts, and from the dispersion or offset voltage a1 in a combining circuit, 42, which is a well known operational amplifier circuit.

The voltage value $+2d'$ represents the upper expected incoming signal level. The value $+d'$ volts can be obtained from the $+2d'$ volts through a divider, 43, constructed much as divider 39. The value $a'$ volts is designated the UPPER LEVEL DISPERSION voltage signal and also is determined by the nature of the degradation of the incoming baseband analog signal. The value $(2d'-a')$ volts can be developed from the value of $+2d'$ volts and from the dispersion voltage $a'$ through a combining circuit, 44, which is constructed in the manner of combining circuit 42.

Another lower dispersion voltage, the LOWER LEVEL SECOND DISPERSION voltage signal, $a_2$, is also provided. The voltage value $-(2d-a_2)$ is developed in the same manner as the voltage value $-(2d-a_1)$.

The remaining comparator reference level, zero (0) volts, is the reference level from which all the other reference levels are determined.

Each comparator in the amplitude range classifier will have a signal level shift from the low logic state voltage to the high logic state voltage at the output thereof when that comparator has switched because an incoming signal data sample from block 18, applied to the non-inverting input (+ input) thereof, has exceeded the particular reference signal applied to the inverting input (− input) thereof. The relationship between the comparator outputs that have a high logic state voltage in a baud period versus those that do not provide the desired information concerning the amplitude of the data sample taken in that period. That is, these output signal level shifts provide the information as to which of the amplitude subranges, separated by the various reference voltages described in the immediately preceding paragraphs, is the subrange which extends over the amplitude value occurring for the data sample obtained from the incoming signal in that baud period, as this sample was provided at the output of sample and hold circuit 18.

Further, the comparator logic states after any signal shifts occurring at the comparator outputs are stored in the connected D-type flip-flops throughout a baud period to thereby provide logic signals containing data sample amplitude range information for the data sample taken for that baud period. These logic signals from the D-type flip-flops can be operated upon logically in other circuitry in the system for the purpose of extracting this amplitude information, and related information, concerning the data samples being obtained from the incoming baseband analog signal.

All of this succeeding circuitry is supplied the timing signal MONITOR SYSTEM CLOCK so that it operates in conjunction with the values stored in the D-type flip-flops. That is, the succeeding system blocks only operate on logic signals obtained from the D-type flip-flops after the holding period, due to block 37, which began with the taking of the data sample taken in the baud period, has elapsed. Thus as earlier stated, transients are permitted to decay in the amplitude range classifier system portions ahead of the D-type flip-flops so that the succeeding system blocks after the flip-flops are properly synchronized with correct data sample information as available at the outputs of the D-type flip-flops.

The outputs of all of the D-type flip-flops have signal lines extending therefrom. These signal lines lead to other circuitry which is used to perform subsequent operations. Along each of these signal lines is written, in inequality form, the information which is stored in the corresponding D-type flip-flop in a baud period. That is, each data sample obtained from the incoming baseband analog signal is assumed to be represented in value by the discrete time, analog variable, X. The output logic states of the D-type flip-flops indicate, for a baud period, whether the data sample X has sufficient amplitude to exceed the reference signal applied to the inverting inputs of the corresponding comparators. This decision, to be made by the corresponding comparator, is indicated by the inequality appearing at the output of each D-type flip-flop.

Since this decision, to be made by each comparator and stored in its corresponding D-type flip-flop, is of a true or false nature, the D-type flip-flop output logic variable can be represented by having the decision inequality written in parentheses along the output lines extending from the Q output in each of the D-type flip-flops. A true, or high, state at a D-type flip-flop output indicates that the inequality written along the line extending from that output has been satisfied, whereas a false, or low, logic state indicates the inequality has not been satisfied.

The embodiments of the invention in which an exclusive property or right is claimed are defined as follows:

1. An input signal amplitude range classifier for classifying amplitude values of an input analog signal into amplitude ranges, said classifier providing an indication as to whether a sample value of said input analog signal occurs within one of a plurality of input signal amplitude ranges, said classifier comprising:

a sample and hold means, adapted to receive said input analog signal at an input thereof, and which has a sample and hold means output, said sample and hold means being capable of providing, for a holding period, a data sample of said input analog signal at said sample and hold means output, said data sample having an amplitude which is free of further influence by said input analog signal during said holding period;

a plurality of comparator means each having a comparison input, a reference input and a comparator means output, each said reference input adapted to have a reference signal applied thereto, each said comparison input being connected to said sample and hold means output, and each said comparator means being capable of providing a comparator means output signal level shift at said comparator means output thereof when a said data sample sufficiently differs from said reference signal corresponding to said comparator means; and a plurality of utilization means each having a utilization input and an enabling input with there being one of said utilization means corresponding to each one of said comparator means, each said utilization means input being connected to its corresponding said comparator means output, each said enabling input adapted for having an enabling signal applied thereto after a delay period which begins at that point in time when said holding period begins, and each said utilization means being capable of responding, at least completely, to a said comparator means output signal level shift only after said enabling signal is applied to said enabling input thereof.

2. The apparatus of claim 1 wherein each of said utilization means includes a storage means having a storage means input and an enabling input, said storage means input being connected to its corresponding said comparator means output and said enabling input being adapted to have applied thereto said enabling signal, said storage means being capable of responding, at least completely, to a said comparator means output signal level shift only after said enabling signal is applied to said enabling input thereof.

3. The apparatus of claim 2 wherein each of said storage means comprises a D-type flip-flop.

* * * * *